United States Patent [19]
Vollmer

[11] Patent Number: 6,146,530
[45] Date of Patent: Nov. 14, 2000

[54] PROCESS AND APPARATUS FOR REMOVING PARTICLES OF PAINT OVERSPRAY FROM AN AQUEOUS TURBID LIQUID

[75] Inventor: Heinz-Georg Vollmer, Wettringen, Germany

[73] Assignee: Olt Oberflaechen-, Luft-und Trocknugstechnik GmbH, Metelen, Germany

[21] Appl. No.: 09/120,918

[22] Filed: Jul. 22, 1998

[30] Foreign Application Priority Data

Jul. 26, 1997 [DE] Germany ............................ 197 32 207

[51] Int. Cl.⁷ .............................. B01D 21/02; B01D 1/24
[52] U.S. Cl. ......................... 210/295; 210/143; 210/167; 210/196; 210/259; 210/532.1; 210/533; 210/540
[58] Field of Search ................................. 210/224, 195.1, 210/806, 225, 252, 257.1, 136, 112, 114, 533, 536, 540, 800, 801, 803, 804, 805, 770, 117, 295, 532.1, 519, 167, 143, 196, 259, 236

[56] References Cited

U.S. PATENT DOCUMENTS

| | | |
|---|---|---|
| 3,480,542 | 11/1969 | Bucksteeg et al. . |
| 3,764,013 | 10/1973 | Eisenmann ............................... 210/205 |
| 4,104,167 | 8/1978 | Besik ....................................... 210/129 |
| 4,472,181 | 9/1984 | Herrlander . |
| 4,714,558 | 12/1987 | Barbee et al. ........................... 210/776 |
| 4,818,388 | 4/1989 | Morioka et al. ......................... 210/167 |
| 5,062,963 | 11/1991 | Marcinkowski et al. ............... 210/712 |
| 5,080,806 | 1/1992 | Balzano ................................... 210/730 |
| 5,647,986 | 7/1997 | Nawathe et al. ........................ 210/608 |
| 5,720,885 | 2/1998 | Moos ....................................... 210/710 |

FOREIGN PATENT DOCUMENTS

| | | |
|---|---|---|
| 3837638 | 5/1990 | Germany . |
| 3923437 | 1/1991 | Germany . |
| 93048548 | 7/1993 | Germany . |

*Primary Examiner*—W. L. Walker
*Assistant Examiner*—Marianne S. Ocampo
*Attorney, Agent, or Firm*—Milde, Hoffberg & Macklin, LLP

[57] ABSTRACT

Particles of paint overspray present in floating, and in dispersed form, as well as in submerged and coagulated form are removed from an aqueous turbid liquid. The dispersed and submerged particles of paint overspray form sediment and the sediment is then removed. The sediment is allowed to settle out of a quiescent, turbid liquid onto the bottom of a first tank, whereas the floating particles remain on the surface of the turbid liquid. The sediment is flushed into a second tank by lowering the surface level of the turbid liquid and is then concentrated in this second tank. The surface level of the turbid liquid is then raised and the turbid liquid is allowed to overflow across a flow edge in such a way that the floating particles of the paint overspray are floated off. The turbid liquid, such as turbid water that has been cleansed is drained off.

22 Claims, 1 Drawing Sheet

PROCESS AND APPARATUS FOR REMOVING PARTICLES OF PAINT OVERSPRAY FROM AN AQUEOUS TURBID LIQUID

BACKGROUND OF THE INVENTION

The present invention relates to a process for removing particles of paint overspray from an aqueous turbid liquid, the particles of paint overspray being present in floating and dispersed form, as well as in submerged and coagulated form, at least the dispersed and submerged particles of paint overspray forming sediment and then being removed. In addition, the present invention relates to an apparatus for carrying out this process, this having at least one sedimentation tank.

Particles of paint overspray are washed out wet and move into sedimentation-removal plants. DE 93 04 854 U1 describes an apparatus for separating paint sludge and water for a paint-mist separator plant. In this, the sediment in a quiescent turbid liquid settles on the bottom of the tank, whereas the floating particles remain on the surface of said turbid liquid. The floating particles are removed by a conveyor with a skimmer. The paint sludge that builds up is removed from the bottom of the container through a sump that can be shut off, using delivery pumps, and the turbid water that has been cleansed is drained off. One disadvantage of this is that when the sediment is being removed or when the floating particles are being skimped off the surface of the turbid liquid, if the paint has not fully dried, this leads to agglomeration of the paint particles and hardening, and thus to blockages and excessive loads on the motors used for the loader and the pumps. In addition, if the feed line is left open, the tank can flood, so the level to which the tank is filled must be monitored constantly, either manually or by a level sensor.

DE 39 23 437 A1 describes a painting process and apparatus, in which the sediment is flushed out of a first tank into a second tank through a line that connects the two tanks, and is then concentrated in the second tank. Once again, it is a disadvantage that the mixture composed of water and tacky paint particles must pass through components such as filters, nozzles, and pumps that are easily blocked, so that once again this can result in agglomeration and adhesion and thus to the failure of such components. In addition, the sediment can only be removed from the sump at the bottom of the second tank by means of a collector basket. The collector basket can only be removed and cleaned manually, when the plant is not operating, so that economic disadvantages result from this fact alone.

DE 38 37 638 A1 describes how the surface level of the turbid liquid within the tank can be raised by causing it to build up by means of a movable sliding dam and then decanting a floating layer composed of greases, highly viscous oils and other floating substances by way of an overflow edge. Because of the required parts of the movable sliding dam, which are exposed to the turbid liquid, this process is not suitable for separating tacky paint particles since there is always a possibility that the mechanical guides for the sliding dam may gum up. Particles that do not float but which form sediment thus cannot be removed by this.

SUMMARY OF THE INVENTION

The principal object of the present invention is to provide a process and an apparatus that, as compared to the prior art, simplifies the removal of particles of paint overspray from an aqueous turbid liquid, provides a high level of operating safety, and prevents overflooding of the apparatus.

This objective has been achieved by a process of the type described in the introduction hereto, using the following steps:

a) the sediment is allowed to precipitate from a quiescent turbid liquid at the bottom of a first tank, whereas floating particles remain on the surface of the turbid liquid;

b) the sediment is flushed into a second tank and concentrated, this being done by lowering the surface level of the turbid liquid;

c) the surface level of the turbid liquid is then raised once again and the turbid liquid is allowed to flow over a flow edge, such that the floating particles of paint overspray are floated off;

d) the turbid water that has been cleanse is drained off.

In principle, the process works with two adjacent tanks, the first of which accommodates the turbid liquid and allows it to settle, whilst in the same tank it is possible to float off the buoyant particles of paint overspray by simply raising the surface level of the turbid liquid, so that these particles then pass into the second tank.

The steps (a) to (c) described above can also be carried out so that they overlap in time, and this then results in a quasi-continuous process for removing particles of paint overspray.

It is possible to dispense with a drain pump for the sediment that has to be moved if this sediment can be moved into the second tank by a drop in hydrostatic pressure, so that the assistance of a pump is not necessary.

In this connection, it is proposed that the sediment that settles out of the quiescent turbid liquid be allowed to settle, ready to be flushed out, by the opening of a pipe that extends almost to the lowest point in the bottom of the first tank. When an appropriate valve is operated, it then picks up the sediment with a minimum of wash water.

The water can be removed from the sediment that is transferred into the second tank by pressing the sediment. However, it is also possible to use sludge agitators and filtering screens to remove this water.

An apparatus used to carry out this process comprises the following parts:

a) the first sedimentation tank, in which the sediment settles out of a quiescent turbid liquid onto the bottom of the tank, while the floating particles remain on the surface of the turbid liquid;

b) a second tank that is connected to the first tank through a transfer pipe, through which the sediment can be flushed out of the the first tank by lowering the surface level of the turbid liquid;

c) a flow edge in the upper area of the first sedimentation tank, over which the turbid liquid is made to flow;

d) a return line that is connected to the first sedimentation tank, through which the turbid water that has been cleansed can be drained off.

The individual parts listed above make it possible to carry the out the process with a minimum outlay. The transfer pipe that is intended to move the sediment by a drop in hydrostatic pressure is preferably fitted with a remotely operated diaphragm-type valve.

A similar valve is also installed in the return line.

It is particularly advantageous that the second tank be provided with an overflow that ends in a return line. In this embodiment, the tank will not overflow even if excessive quantities of turbid liquid are delivered to it and the pump and line functions fail, since the return line passes the turbid liquid back to the main system. It is preferred that all the return lines referred to above terminate in a catch basin for the turbid liquid that flows from the spray plant.

A tank bottom that is in the shape of an inverted cone has been found to be particularly favourable for accommodating the sediment; within the first tank this is arranged around the opening of the pipe that ends just above the deepest point in the bottom of the tank.

A distributor pipe that is open at the top and which is of a diameter that is at least twice that of the feed pipe, and which is arranged centrally relative to the sedimentation tank, has been found particularly favourable for ensuring an even inflow of the turbid liquid with the particles of paint overspray. This results in steady charging on the first sedimentation tank, without any great swirling of the sediment that is to be allowed to settle.

The valves and pumps can be controlled by a computerised control program as a function of the settling and reaction times that are anticipated, so that a quasi-automatic sequence results.

BRIEF DESCRIPTION OF THE DRAWINGS

One embodiment of the present invention is shown in the drawing appended hereto. This drawing shows an apparatus for carrying out a process that is used to remove particles of paint overspray.

DESCRIPTION OF THE PREFERRED EMBODIMENTS

Figure 1:
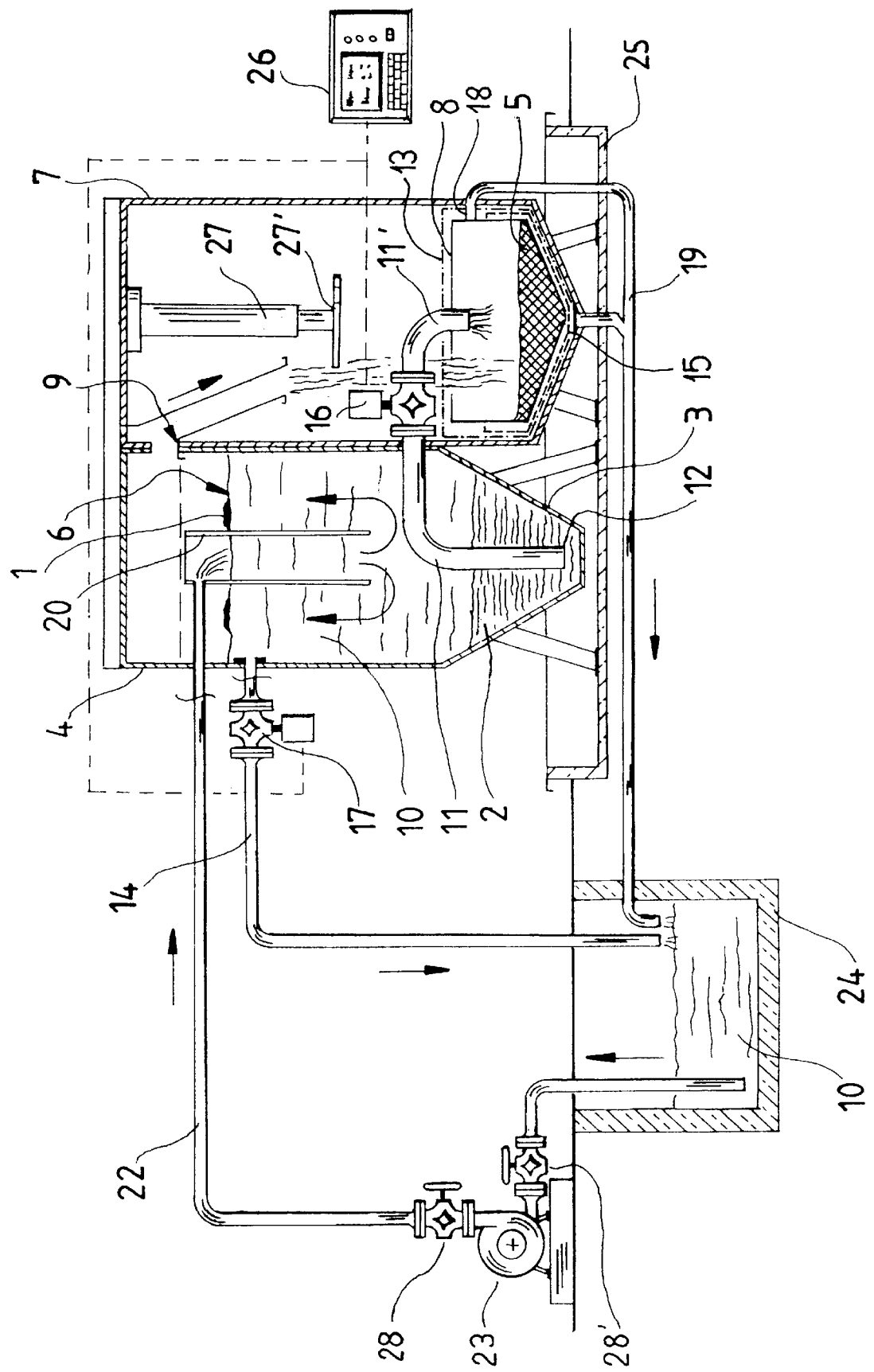

An aqueous turbid liquid 10 is transferred through a feed pipe 22 from a water catch basin 24 that is associated with a painting plant (not shown herein) to a first sedimentation tank 4 by means of a pump 23. Arranged centrally in this sedimentation tank there is a distributor pipe 20 that is open at the top and which is of a diameter that is four times the diameter of the feed pipe 22. The turbid liquid that flows into the distributor pipe 20 is thus distributed mainly onto the walls of the first sedimentation tank 4, where it forms a laminar downward flow.

The feed line 22 can be opened and closed prior to and after the circulating pump 23 by gate valves 28 and 28'.

The lower part of the first sedimentation tank 4 ends as an inverted conical bottom 3 in which a sediment 2 can settle out of the turbid liquid 10. The lower end of a U-shaped pipe extends into the inverted conical bottom 3; this is referred to as transfer pipe 11. The transfer pipe 11 terminates just above the lowest point of the inverted conical bottom 3 so that sediment 2 that has settled collects in front of the opening 12 of the pipe 11 that ends just above the lowest point of the bottom 3, and is thus ready for removal.

Beneath the surface level 6 of the turbid liquid, the transfer pipe 11 passes into a second tank 7, where it ends at an outflow elbow 11' from which the sediment sludge flows out in the direction of fall.

There is a paint-sludge ram 27 above the level of the sludge, and th is forces the water out of the sedimentation sludge into an overflow 18 and into a return line 19 that then passes the express ed water back to the water catch basin 24.

The partition between the two tanks 4 and 7 is open at the top to form a flow edge 9. If the surface level 6 of the turbid water rises to the height of the flow edge 9, the turbid liquid flows over the flow edge 9 so that the floating particles of paint overspray are floated off into the interior compartment of the second tank 7. The turbid water that has been cleaned can be drained off from the tank 4 through a line 14, and a diaphragm-type valve 17 controls this drawing process.

In one particularly advantageous embodiment, the second tank 7 is fitted with a removable interior container 8. This interior container can be a paint sludge container that can be moved on rails, so that it is simple to remove the paint sludge that is gene rated from the apparatus and then move it on for further treatment.

In addition, a computerised control program 26 is provided, and this controls the valves as required.

The manner in which the apparatus described heretofore functions, and the individual steps of the process will be described in greater detail below:

First, the valves 16 and 17 are closed. The gate valves 28, 28' are opened and the pump 23 is started. Turbid water with paint sludge that is present in it in floating, in dispersed, as well as in submerged and coagulated form is moved from the water catch basin 24 through the line 22 into the tank 4 until the surface level of the turbid liquid reaches the level of the flow edge 9. Then, the turbid liquid is allowed to stand for a period of about 30 minutes, so that the sedimenting sludge can settle onto the inverted conical bottom, around the opening 12 of the transfer pipe 11. Then the valve 16 is opened. Because of hydrostatic pressure, which acts according to the principle of communicating pipes, a sedimentation sludge then immediately flows into the second tank 7 at considerable speed, carrying the sediment that has been generated with it, and it then settles in the lower area of the internal container 8. Once this cross flow has ended, the valve 16 is closed.

As further turbid liquid is introduced through the line 22, the surface level 6 rises once again until it reaches a point just above the flow edge 9, so that the turbid liquid flows over the flow edge 9 in such a way that the floating particles of paint overspray 1 are floated off into the second tank 7 with the interior container 8. Any excess water is decanted through the overflow 18 and flows back to the water catch basin 24. The paint sludge ram 27' of the sludge press 27 is moved downwards and presses most of the water out of the sedimentation sludge 5.

The interior container 8 can be detached from the tank 7 and moved away, together with its contents. It is also possible to make the unit comprising the tanks 4, 7 and/or container 8 mobile, and remove the contents.

It is essential that the system cannot overflow in the event that one function should fail. If the sedimentation tank 4 is overfilled, the water runs over the flow edge 9 into the interior container 8 of the second tank 7, where it flows through an overflow 18 and the return line 19 back to the water catch basin 24. This function is performed without a regulating level sensor.

The complete apparatus as shown in the drawing is usually set up in a safety basin 25 that functions as a catch basin, in order to preclude any form of contamination.

There has thus been shown and described a novel process and apparatus for removing particles of paint overspray from an aqueous turbid liquid which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

REFERENCE NUMBERS 1 floating particles
2 sediment
3 inverted conical bottom
4 first tank
5 sedimentation sludge
6 surface level of turbid water
7 second tank
8 interior compartment 9 flow edge
10 aqueous turbid liquid
11 transfer pipe
11' pipe elbow
12 opening
13
14 return line
15
16 diaphragm-type valve
17 diaphragm-type valve return line
18 overflow
19 return line
20 distributor pipe
21
22 feed pipe
23 circulating pump
24 water catch basin
25 safety basin
26 computerized control program
27 paint-sludge press
28, 28' gate valves

What is claimed is:

1. An apparatus for removing particles of paint overspray from an aqueous turbid liquid, the particles of paint overspray being present in floating, and in dispersed form, as well as in submerged and coagulated form, at least the dispersed and submerged particles of paint overspray sedimenting and then being removed, said apparatus comprising, in combination:
   (a) a first sedimentation tank, onto the bottom of which the dispersed and submerged particles forming sediment, whereas the floating particles remain on the surface of the turbid liquid;
   (b) a second tank having an inverted conical bottom and, connected to the first sedimantation tank (4) by a transfer pipe, by means of which the sediment can be flushed out of the first sedimentation tank by lowering the surface level of the turbid liquid, and said second tank comprising a removable internal container which has a perforated body and an inverted conical bottom corresponding to the bottom of the second tank;
   (c) a flow edge, in an upper area of the first sedimentation tank, across which the turbid liquid can be made to overflow;
   (d) a first return line, connected to the first sedimentation tank, through which the turbid liquid that has been cleaned can be drained off.

2. An apparatus as defined in claim 1, wherein the transfer pipe runs completely beneath the surface level of the turbid liquid.

3. An apparatus as defined in claim 1, wherein the transfer pipe incorporates a remotely operated diaphragm-type valve.

4. An apparatus as defined in claim 1, wherein the first return line incorporates a remotely operated diaphragm-type valve.

5. An apparatus as defined in claim 1, wherein the second tank includes a paint-sludge press.

6. An apparatus as defined in claim 1, wherein the second tank is fitted with an overflow and a second return line.

7. An apparatus as defined in claim 6, wherein at least one of the first and second return lines terminates in a water catch basin for the turbid liquid that flows out of a spray installation.

8. An apparatus as defined in claim 1, wherein the first sedimentation tank has an inverted conical bottom that is arranged around the opening of the transfer pipe that ends just above the lowest point of the bottom of the first sedimentation tank.

9. An apparatus as defined in claim 1, wherein the turbid liquid is introduced into the first sedimentation tank from a feed pipe and through a distributor pipe that is arranged centrally relative to the first sedimentation tank and which is open at the top, and the diameter of the distributor pipe being at least twice that of the feed pipe.

10. An apparatus as defined in claim 3 or 4, wherein the valve can be controlled by a computerized control program.

11. An apparatus as defined in claim 1, wherein the second tank includes a sludge agitator and a filter screen.

12. An apparatus for removing particles of paint overspray from an aqueous turbid liquid, the particles of paint overspray being present in floating, and in dispersed form, as well as in submerged and coagulated form, at least the dispersed and submerged particles of paint overspray sedimenting and then being removed, said apparatus comprising, in combination:
   (a) a first sedimentation tank, onto the bottom of which the dispersed and submerged particles forming sediment can settle out of a quiescent turbid liquid, whereas the floating particles remain on the surface of the turbid liquid;
   (b) a second tank, connected to the first sedimentation tank by a transfer pipe, by means of which the dispersed and submerged particles forming sediment can be flushed out of the first tank by lowering the surface level of the turbid liquid;
   (c) a flow edge, in an upper area of the first sedimentation tank, across which the turbid liquid can be made to overflow;
   (d) a first return line, connected to the first sedimentation tank, through which the turbid liquid that has been cleaned can be drained off; wherein the turbid liquid is introduced into the first sedimentation tank from a feed pipe and through a distributor pipe that is arranged centrally relative to the first sedimentation tank and which is open at the top, the diameter of the distributor pipe being at least twice that of the feed pipe.

13. An apparatus as defined in claim 12, wherein the transfer pipe runs completely beneath the surface level of the turbid liquid.

14. An apparatus as defined in claim 12, wherein the transfer pipe incorporates a remotely operated diaphragm-type valve.

15. An apparatus as defined in claim 12, wherein the first return line incorporates a remotely operated diaphragm-type valve.

16. An apparatus as defined in claim 12, wherein the second tank includes a paint-sludge press.

17. An apparatus as defined in claim 12, wherein the second tank is fitted with an overflow and a second return line.

18. An apparatus as defined in claim 12, wherein the second tank is fitted with a removable internal container.

19. An apparatus as defined in claim 12, wherein at least one of the return lines first and second terminates in a water catch basin for the turbid liquid that flows out of a spray installation.

20. An apparatus as defined in claim 12, wherein the first sedimentation tank has an inverted conical bottom that is arranged around the opening of the transfer pipe that ends just above the lowest point of the bottom of the first tank.

21. An apparatus as defined in claim 14 or 15, wherein the valve can be controlled by a computerised control program.

22. An apparatus as defined in claim 1, wherein the second tank includes a sludge agitator and a filter screen.

* * * * *